(12) United States Patent  
Klotsche (10) Patent No.: US 7,907,568 B2
(45) Date of Patent: Mar. 15, 2011

(54) METHOD OF PERFORMING A HANDOVER (75) Inventor: Ralf Klotsche, Neuenburg (DE)

(73) Assignee: Alcatel Lucent, Paris (FR)

( * ) Notice: Subject to any disclaimer, the term of this patent is extended or adjusted under 35 U.S.C. 154(b) by 840 days.

(21) Appl. No.: 11/740,610

(22) Filed: Apr. 26, 2007

(65) Prior Publication Data

US 2007/0254664 A1    Nov. 1, 2007

(30) Foreign Application Priority Data

Apr. 28, 2006   (EP) .................................... 06290709

(51) Int. Cl.
*H04W 4/00*    (2009.01)
(52) U.S. Cl. ......... 370/331; 455/436; 455/437; 455/442
(58) Field of Classification Search .......... 455/436–444; 370/338
See application file for complete search history.

(56) References Cited

FOREIGN PATENT DOCUMENTS

| EP | 1098540 A1 | 5/2001 |
| WO | WO 2005/109825 A1 | 11/2005 |
| WO | WO 2005109825 | * 11/2005 |
| WO | WO 2006/028622 A1 | 3/2006 |

OTHER PUBLICATIONS

Max Riegel: "WiMax Network Architecture," Dec. 2, 2005, pp. 1-55, XP002401207.

* cited by examiner

*Primary Examiner* — Charles N Appiah
*Assistant Examiner* — Natasha Cosme
(74) *Attorney, Agent, or Firm* — Fay Sharpe LLP (57) ABSTRACT

There is provided a method of performing a handover of a mobile station. The method in accordance with the invention comprises the step of receiving a dataflow which comprises the downlink data traffic to the mobile station and the step of queuing the dataflow. The method in accordance with the invention comprises further the step of generating a first dataflow during handover of the mobile station from the queued dataflow, wherein the first dataflow has a dataflow rate which is below a given first rate. The first dataflow is sent towards the mobile station during handover. The method in accordance with the invention furthermore comprises the step of generating a second dataflow from the queued dataflow after completion or abortion of the handover, wherein the second dataflow has a dataflow rate which is above a given second rate. The second dataflow is sent towards the mobile station. In other aspects the invention relates to a communication network, to a communication network component and to a computer program product for performing the method in accordance with the invention.

9 Claims, 4 Drawing Sheets

METHOD OF PERFORMING A HANDOVER

BACKGROUND OF THE INVENTION

The invention is based on a priority application EP 06 290 709.2 which is hereby incorporated by reference.

The invention relates to a method of performing a handover of a mobile station in general and to a method of performing a handover of a mobile station by regulating the dataflow to the mobile station during the handover in particular. In other aspects the invention relates to a communication network, to a communication network component and to a computer program product for performing the method in accordance with the invention.

The term handover refers to the process of transferring an ongoing call or data session of a mobile station from a first base station of a communication network to a second base station of the communication network or from one access technology to another access technology. The communication network can for example be a cellular communication network, wherein a first and a second base station serve two adjacent cells. The mobile station can then be placed in a cell that is served by the first base station while having established a connection, e.g. an active call, to the communication network via the first base station. If the mobile station is then physically moved to an adjacent cell served by the second base station then the connection is transferred during the handover phase from the first base station to the second base station. After completion of the handover, the mobile station is connected to the communication network via the second base station.

An active call or data session of a mobile station can also be transferred in a handover process from one access technology to another access technology. For example the mobile station can establish initially a data session by use of a UMTS network which is then handed over to a communication network that employs the IEEE 802.16 (WIMAX) standard.

Within one technology advanced strategies for handover like "soft handover" and "fast base station switch" are possible but such handovers pose additional requirements on the mobile station and restrictions on the air interface. In the generic case the mobile station can only be connected to one base station or one access technology at a time (a change in access technology usually implies also a change of the base station). Thus the mobile station must drop the connection for a brief period of time during handover phase while it is handed over from one base station to the other base station or from one access technology to the other access technology. Such a handover is usually referred to as a hard handover. The connection is broken and then remade. This type of handover is also referred to as a 'break before make' type handover.

Since the connection between the mobile station and the communication network is broken temporarily in a break before make type handover there is always a side effect on the services, e.g. on the call or on the data session, that are provided to the mobile station. The requirements to organize this type of handover as seamless as possible vary by the type of protocol a service runs on. On one hand voice over IP (VoIP) and streaming services that rely on real time protocols, e.g. RTP, have little sensitivity for (sparse) packet loss and packet reordering but are severely degraded by delays, jitter and traffic burstiness. On the other hand, services running on the transmission control protocol (TCP) which is used for web browsing, file transfers and downloads cope with delays, jitter and traffic burstiness but react with poor transmission quality on packet loss and especially packet reordering.

According to prior art, a so called bi-cast method is employed during the handover phase. In the bi-cast method, the download dataflow, which is the amount of data that is sent to the mobile station, is duplicated and distributed on each branch in the access serving network (ASN) that is involved in the handover process. For example if the handover is performed between a first and a second base station, then the branches of the access serving node would be the network path from a gateway in the access network to the first base station and to the second base station. The 'break time' in a break before make type handover is considerably short because the data traffic is sent to both branches involved in the handover process, but the mobile station cannot be sure to reach the packet flow on the second base station to which it is handed over at the right timing position, because the transmission delay on the different branches may vary. This delay variance is for example caused by a different number of hops that are involved before the data traffic is sent by the base station or by different scheduler strategies or even load on the base stations. So unwanted effects like packet loss, reordering, or duplicate receipts are likely to occur with a random and unpredictable pattern. During handover a considerable amount of blind traffic is produced in the access network by the packet duplication. Thus a considerable amount of resources might be wasted.

Alternatively according to prior art, the dataflow to the mobile station can be totally blocked at the anchor point, which is the point in which the two branches as described above are routed. The total blocking produces the worst case of delay and jitter with the additional risk of buffer overflows at the anchor point.

There is therefore a need for an improved method of performing a handover of a mobile station. There is need for an improved communication network component, for an improved communication network and for a computer program product that is adapted to perform the method in accordance with the invention.

SUMMARY OF THE INVENTION

In accordance with an embodiment of the invention, there is provided a method of performing a handover of a mobile station. The method in accordance with the invention comprises the step of receiving a dataflow which comprises the downlink data traffic to the mobile station and the step of queuing the dataflow. The method in accordance with the invention comprises further the step of generating a first dataflow during handover of the mobile station from the queued dataflow, wherein the first dataflow has a dataflow rate which is below a given first rate. The first dataflow is sent towards the mobile station during the preparation phase of the handover. The method in accordance with the invention furthermore comprises the step of generating a second dataflow from the queued dataflow after completion or abortion of the handover, wherein the second dataflow has a dataflow rate which is above a given second rate. The second dataflow is then sent towards the mobile station.

The dataflow that is initially received is queued. Thus due to the queuing of the dataflow the dataflow rate can be regulated. During the handover or more precisely during the preparation phase of the handover, the first dataflow that is typically at a lower dataflow rate is further processed while after the completion or the abortion of the handover, the second dataflow that is typically at a higher flow rate is further processed towards the mobile station. The dataflow that relates to the downlink data traffic of the mobile station is thus reduced during the handover as the first dataflow is further processed towards the mobile station. After the handover, the data traffic rate to the mobile station is therefore temporarily increased as the second dataflow is processed towards the mobile station.

Due to the temporary increase in the data flow rate, the queue will be at least partially emptied. The first rate and the second rate can be seen as threshold values. It is ensured by the method in accordance with the invention that the rate of the first dataflow is below the threshold value as given by the first rate during the preparation phase of the handover, and that the rate of the second dataflow is above the threshold value as given by the second rate for a given period of time after the handover has been completed or aborted, In the context of regulation of the dataflow one speaks also of 'shaping' of the dataflow. The method in accordance with the invention as described above can be understood as a 'shaping' of the dataflow. The dataflow that relates to the downlink data traffic of a mobile station is shaped during the handover of the mobile station so that the dataflow that is further processed towards the mobile station has a dataflow rate that is below the first rate. After completion or abortion of the handover, the dataflow to the mobile station is shaped so that the dataflow rate of the second dataflow that is further processed towards the mobile station is above the second rate.

The dataflow of the downlink data traffic to the mobile station is therefore temporarily throttled during the handover of the mobile station and temporarily boosted after the completion or abortion of the handover. During the throttling of the downlink data traffic, the mobile station's application buffer should be able to bridge the throttled data flow for the duration of some 100 Microseconds, the typical time of a handover. The method in accordance with the invention is not restricted for usage within a specific transport network as the IP layer and layer 2 (MAC layer) are only loosely coupled. The method in accordance with the invention can be used well together with any transport network.

In accordance with an embodiment of the invention, the first dataflow and the second dataflow that are generated from the queued dataflow correspond to the downlink data traffic of the mobile station. As such only the data flow rate of the download data traffic to the mobile station is reduced during the handover phase and temporarily increased after the handover phase.

In accordance with another embodiment of the invention, the first dataflow and the second dataflow relate to the queued dataflow of the aggregated data traffic. The queued dataflow can therefore comprise data traffic that is to be transmitted to other mobile stations that are not involved in the handover. For these mobile stations, the data flow rate is as well temporarily reduced and increased. The effect on the mobile stations is usually negligible as the mobile stations' application buffers should be able to bridge the reduced data flow. The method in accordance with the invention is particularly advantageous as there is no need to resolve the queued dataflow with respect to the receiver.

In accordance with an embodiment of the invention, the second dataflow is sent towards the mobile station for a given period of time after completion of the handover or after abortion of the handover. The data traffic that is sent towards the mobile station is therefore temporarily boosted for a given period of time after completion or abortion of the handover in order to deplete the queue. Afterwards, the dataflow as received by the queue is further processed towards the mobile station so that the dataflow rate fulfills for example a service level agreement. The given period of time can be related to the amount of time that is needed to perform the handover so that the second dataflow compensates for the foregoing reduction of the dataflow rate.

In accordance with an embodiment of the invention, the dataflow comprises a sequence of data packets, wherein the first dataflow and the second dataflow is generated so that the sequence of data packets remains the same. The downlink data traffic of the mobile station is made up of a sequence of data packages. The dataflow rate is used in order to quantify the dataflow. It is measured for example in bits per second or megabytes per second. The first dataflow is produced from the queued data packages of the dataflow by processing the queued data packages at a rate that yields a dataflow rate which is below the first rate, which is typically smaller as the dataflow rate of the received flow. After completion of the handover or after abortion of the handover, the queued sequence of data packages is processed so that the second dataflow that is sent towards the mobile station is at a rate above the second rate. The ordering of the data packages is not changed since the received data packages of the dataflow are queued and processed in a way that does not rearrange the ordering.

In accordance with an embodiment of the invention, the method further comprises the step of detecting the indication of a handover of the mobile station.

In accordance with an embodiment of the invention, the method further comprises the step of detecting the termination of a handover or the abortion of a handover.

In accordance with an embodiment of the invention, the first and the second rate relate to a given bandwidth, to a given data rate or to a criterion such as a service level agreement. A dataflow, e.g. the first/second data flow, is typically specified by a dataflow rate. The dataflow rate can be measured for example in Megabytes per second. In order to compare the dataflow rates of the first and second data flows with the preset first and second rates, the first and second have to be specified in the same unit as the dataflow rates. The first and second rate can however relate to bandwidths that can be used by the mobile station during the handover and after the handover. The bandwidths would then have to be transformed into the corresponding first and second rates.

The mobile station can for example draw downlink data traffic at a given rate (measured at the component that queues the downlink data traffic). The dataflow that is received and queued is further processed towards the mobile station at the given rate. During handover the given rate is reduced, since the first rate is typically set to a lower value and after handover. After completion or abortion of the handover, the given rate is temporarily boosted as the second rate is higher than the given rate. The given rate can also relate to a service level agreement which would have to be specified as a dataflow rate. The service level agreement would be temporarily violated when the first dataflow is processed towards the mobile station while the violation would be compensated after the handover or after abortion of the handover.

The first and the second data rate as specified in the method in accordance with the invention can be given in form in which a dataflow rate is specified by for example bytes per second. If they relate to a bandwidth or to a criterion such as a service level agreement, then they would have to be transformed into the corresponding data rates.

In accordance with an embodiment of the invention, the mobile station is served from a first branch of a communication network before and during the handover, and by a second branch of the communication network after the handover has been completed. The first branch and the second branch are connected with each other via an anchor point in the communication network. The first branch can be seen as the network path from a base station of the communication network to the anchor point while the second branch can be seen as a network path from the second base station to the anchor point. The anchor point, typically called mobility anchor point (by the standardization body IETF), can be hosted by various components of the communication network at a strategically advantageous location (in the network operator's perspective). As mentioned before, the first dataflow and the second dataflow can also relate to the aggregated data traffic. The aggregated data traffic is the total data traffic that passes through the anchor point. By the method in accordance with the invention there is therefore (i) either only the data flow rate of the data traffic that is to be sent to the mobile station involved in the handover temporarily reduced and increased or (ii) the flow rate of the aggregated data traffic passing through the anchor point is temporarily reduced and increased.

In accordance with an embodiment of the invention, the first dataflow is sent from the anchor point to the mobile station via the first branch. The second dataflow is sent from the anchor point to the mobile station via the second branch after the completion of the handover or from the anchor point via the first branch after the abortion of the handover. The method in accordance with the invention is most favorable executed by a component that integrates the anchor point of a communication network. Thus the dataflows are processed by the anchor points towards nodes in the network paths of the first or second branch that are located further downstream or in other words that are closer to the mobile station. Because of this the term 'towards' is used instead of the term 'to' in the context of sending the dataflows towards the mobile station as the dataflows are not sent to the mobile station but further processed towards the mobile station.

In accordance with an embodiment of the invention the anchor point is a mobility anchor point (MAP) of a communication network.

In accordance with an embodiment of the invention, the anchor point is a component of a gateway of a communication network. The first branch corresponds then to the network path between the gateway and a first base station of the communication network and the second branch corresponds then to the network path between the gateway and the second base station of the communication network.

In accordance with an embodiment of the invention the first branch comprises further queues that are used for queuing the dataflow or the data traffic to the mobile station. The first rate is chosen so that these queues of the first branch empty themselves while the handover of the mobile station is in it's preparation phase. This is particularly advantageous as it is ensured that no data packet is lost during the handover.

In accordance with an embodiment of the invention the first branch relates to the network path between a base station of a first access technology and a gateway while the second branch relates to the network path from a base station of a second access technology to the gateway, wherein the gateway interconnects the first access technology and the second access technology.

In another aspect the invention relates to a method of performing a handover of a mobile station, wherein the method comprises the step of receiving a dataflow relating to an uplink data traffic of the mobile station and the step of queuing the dataflow. The method in accordance with the invention furthermore comprises the step of generating during handover of the mobile station a first dataflow from the queued dataflow, wherein the first dataflow has a dataflow rate that is below a given first rate. The method in accordance with the invention comprises the step of sending the first dataflow from the mobile station during handover and the step of generating a second dataflow from the queued dataflow after completion or abortion of the handover, wherein the second dataflow has a dataflow rate which is above the given second rate. The method furthermore comprises the step of sending the second dataflow from the mobile station. The method in accordance with the invention can thus be also executed by a component of the mobile station. This becomes particularly advantageous if the communication network operators work with rare resources like leased lines or fixed wireless links in the backbone network.

In another aspect the invention relates to a communication network component that comprises means for receiving a dataflow comprising the downlink data traffic to a mobile station and means for queuing the dataflow. The communication network component comprises further means for generating during handover of the mobile station a first dataflow from the queued dataflow, wherein the first dataflow has a dataflow rate which is below a given first rate. The communication network component further comprises means for sending the first dataflow towards the mobile station during handover and means for generating a second dataflow from the queued dataflow after completion or abortion of the handover, wherein the second dataflow having a dataflow rate which is above a given second rate. The communication network component further comprises means for sending the second dataflow towards the mobile station.

The communication network component further comprises means for sending the dataflow towards the mobile station and means for specifying the first and the second rate.

In accordance with an embodiment of the invention the communication network component can be used as an anchor point of a first branch and of a second branch, wherein the mobile station is servable by the first branch before and during the handover and by the second branch after the handover.

In accordance with an embodiment of the invention the communication network component is embedded in a gateway. The gateway might for example be located at the edge of a communication network.

In accordance with an embodiment of the invention the communication network component is a Access Service Network Gateway (ASN-GW) in accordance with the WIMAX consortium.

In another aspect the invention relates to a communication network that comprises means for receiving a dataflow comprising the downlink data traffic to a mobile station and means for queuing the dataflow. The communication network comprises further means for generating during handover of the mobile station a first dataflow from the queued dataflow, wherein the first dataflow has a dataflow rate that is below a given first rate. The communication network comprises further means for sending the first dataflow towards the mobile station during handover and means for generating a second dataflow from the queued dataflow after completion or abortion of the handover, wherein the second dataflow has a dataflow rate that is above the given second rate. The communication network further comprises means for sending the second dataflow towards the mobile station.

In accordance with an embodiment of the invention the communication network component further comprises means for detecting that a handover is scheduled or initiated for a mobile station.

In accordance with an embodiment of the invention the communication network further comprises means for sending the second dataflow towards the mobile station.

In accordance with an embodiment of the invention the communication network is a communication network as defined by the consortia of 3GPP, WiMAX, IEEE 802.11, or IEEE802.16.

In another aspect the invention relates to a mobile station that comprises means for receiving and means for queuing its dataflow. The mobile station furthermore comprises means for generating during handover of the mobile station a first dataflow from the queued dataflow, wherein the first dataflow has a dataflow rate which is below a given first rate. The mobile station furthermore comprises means for sending the first dataflow from the mobile station during handover and means for generating a second dataflow from the queued dataflow after completion or abortion of the handover, wherein the second dataflow has a dataflow rate which is above a given second rate. Furthermore the mobile station comprises means for sending the second dataflow and means for sending the dataflow before and after the handover.

In accordance with an embodiment of the invention the base station furthermore comprises means for enforcing the mobile station to queue the uplink data flow.

In accordance with an embodiment of the invention the mobile station furthermore comprises means for sending the second dataflow for a given period of time after completion or abortion of the handover.

In accordance with an embodiment of the invention the mobile station is a mobile phone, a laptop, a computer, a PDA or any other device that is connectable to a wireless communication system.

In another aspect the invention relates to a computer program product that comprises computer executable instructions which are adapted to perform the method in accordance with the invention.

BRIEF DESCRIPTION OF THE DRAWINGS

In the following preferred embodiments of the invention will be described in greater detail by way of example only making reference to the drawings in which.

DETAILED DESCRIPTION

Figure 1:
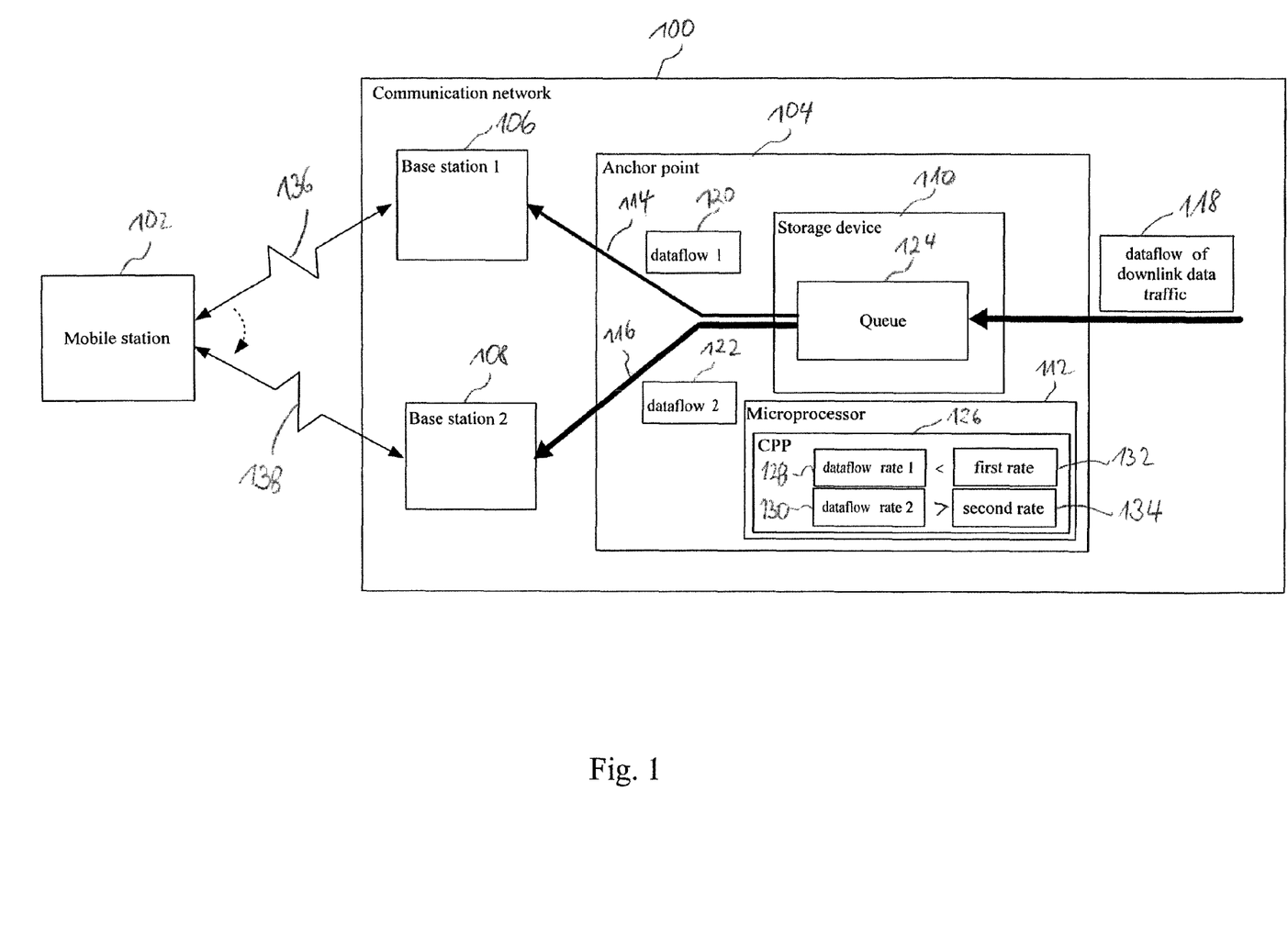
FIG. 1 shows a block diagram of a communication network serving a mobile station.

FIG. 1 shows a block diagram of a communication network 100 serving a mobile station 102. The communication network 100 comprises an anchor point 104, a first base station 106 and a second base station 108. The anchor point 104 comprises a storage device 110 and a microprocessor 112. The anchor point 104 is connected via network path 114 to the first base station 106 and via network path 116 to the second base station 108. The mobile station 102 holds initially a connection 136 to the communication network 100 via base station 106.

The anchor point 104 is situated at the edge of the communication network 100. The network traffic that enters the communication network 100 via the anchor point 104 can be assigned by the anchoring point 104 to the various mobile stations for which the network traffic is destined.

While the connection 136 of the mobile station 102 is established to the communication network 100 via base station 106, the anchor point 104 receives a dataflow 118 which comprises the downlink data traffic of the mobile station 102. The dataflow 118 is queued into a queue 124. The dataflow 118 is composed of a sequence of data packets that are temporarily stored in the queue 124 and further processed by the anchor point 104 towards base station 106 from which the data packets are transmitted to the mobile station 102. When no handover of the mobile station 102 is scheduled, the dataflow 118 is further processed as received by the anchor point 104 towards the mobile station 102.

When a handover of the mobile station 102 is detected, then a first dataflow 120 is shaped during the handover phase. The microprocessor 112 runs a computer program product 126. The computer program product is used to regulate and to shape the first dataflow 120 that is released from the queue 124 so that the dataflow rate 128 of the first dataflow 120 is below a preset first rate 132.

The dataflow rate 128 is typically lower than the dataflow rate of the data flow 118. During the handover the dataflow 118 that relates to the downlink data traffic of the mobile station 102 is therefore reduced as the first dataflow 120 is further processed towards the mobile station 102.

After the handover of the mobile station 102, the data transfer over connection 136 is dropped and the data flow is transferred over connection 138 which is established between the mobile station 102 to the communication network 100 via the second base station 108. After the handover, a second dataflow 122 is generated and sent from the anchor point 104 to the mobile station 102 via the base station 108. The computer program product 126 controls the dataflow rate 130 of the second dataflow 122 so that it is above a preset second rate 134. The second dataflow 122 is sent for a given period of time to the mobile station 102. The period of time can for example be equal to the period of time the first dataflow 120 has been sent.

Figure 2:
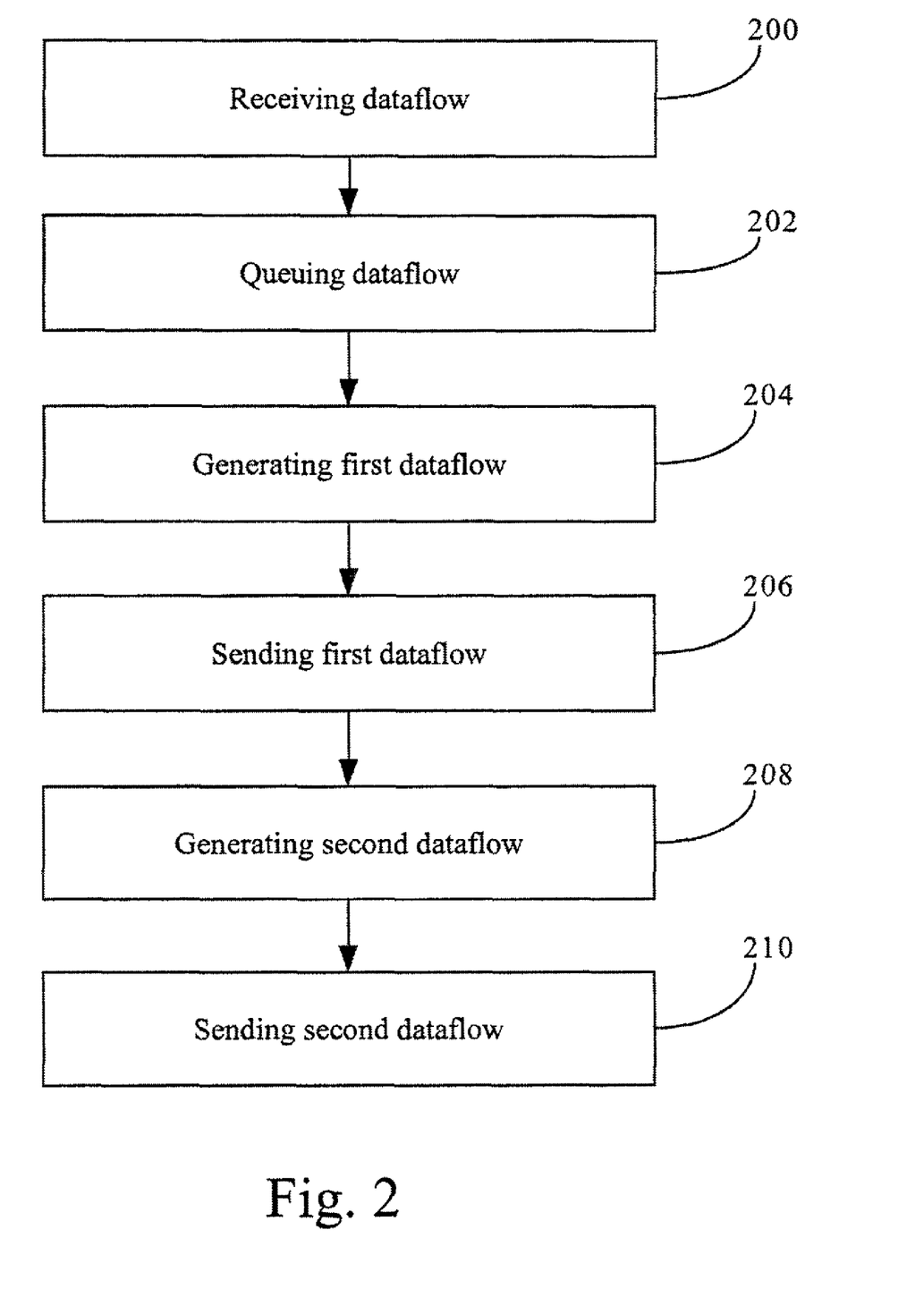
FIG. 2 shows a flow diagram of the basic steps performed by the method in accordance with the invention.

FIG. 2 shows a flow diagram of the basic steps performed by the method in accordance with the invention. In step 200 a dataflow that comprises the downlink data traffic of the mobile station is received. In step 202 the dataflow is queued. In step 204 a first dataflow is generated during handover of the mobile station. The first dataflow has a dataflow rate which is below a given first rate. In step 206 the dataflow is sent towards the mobile station during handover. In step 208 a second dataflow is generated from the queued dataflow after completion or abortion of the handover. The second dataflow has a dataflow rate which is above a given second rate. In step 210 the second dataflow is sent towards the mobile station.

Figure 3:
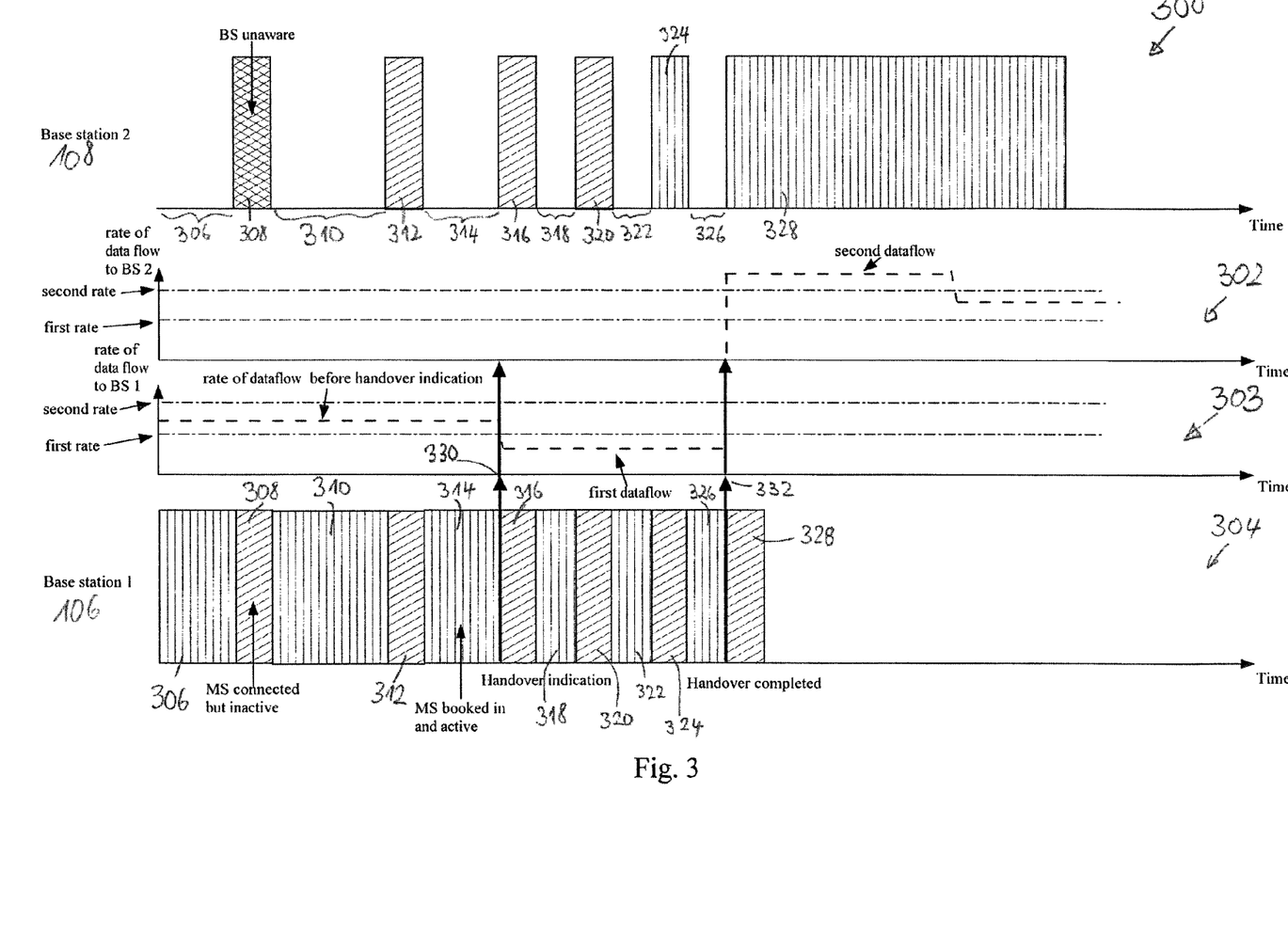
FIG. 3 depicts interactions of base stations with a mobile station before, during and after a handover, and diagrams of the dataflow rates of the dataflows processed towards the mobile station.

FIG. 3 depicts interactions of the base stations and a mobile station before, during, and after a handover and diagrams of the dataflow rates of the dataflows that are processed by the anchor point towards the mobile station. FIG. 3 is split in four graphs 300, 302, 303, and 304. The graph 300 illustrates an example of the communication between the mobile station 102 and the second base station 108 during a handover, while the graph 304 illustrates the communication between the mobile station 102 and the first base station 106. The reference numerals of the mobile station 102, the first base station 106, and the second base station 108 have been taken over from the block diagram of FIG. 1 as FIG. 3 describes exemplary the interactions that occur between the base stations and the mobile station before, during and after the handover.

The graphs 302 and 303 show the dataflow rate of the dataflows that are sent from the anchor point which is for example an Access Service Network Gateway (ASN-GW) in accordance with the IEEE 802.16 (WIMAX) standard.

The abscissas of the graphs 300, 302, 303, and 304 relate to the time. The ordinates of the graphs 300 and 304 are only used to denote the type of interaction that is performed between the mobile station 102 and the base station 106 or 108, respectively. The ordinates of the graphs 302 and 303 denote the data rates of the dataflows measured at the anchor point and that are further processed towards the mobile station 102 via the first base station 106 (graph 303) or to the second base station 108 (graph 302), respectively.

As indicated by the vertically hatched region in graph 304, the mobile station 102 is booked into the first base station 106 and has established an active connection to the first base station 106 during the time interval 306, while there is no interaction in the time interval 306 as indicated in graph 300 with the second base station 108. During time interval 308, the mobile station is still connected to the base station 106 but inactive so no user data is transmitted. During the time interval 308, the mobile station 102 is searching and detecting possible other base stations such as the second base station 108. However, as indicated by the cross hatched region in graph 300, the second base station 108 is still unaware of the mobile station 102. During the time interval 310, the mobile station is booked in and holds an active connection with the first base station 106, while there is no interaction during the time interval 310 with the base station 108. During the time interval 312 the mobile station is inactive at the base station 106 and begins to register to the base station 108 but there is no user data transmission. During time interval 314, there is transmission of user data between the mobile station 102 and the base station 106 while there is no interaction with the base station 108. At the point in time 330, a handover indication takes place. At this point in time, the communication network that serves the mobile station via the first base station 106 tries to transfer an ongoing connection to the second base station 108. After the handover indication the mobile station is connected to but suspended from the base station 106 and continues the registration process with the base station 108 during the time interval 316. Then in the time interval 318 the mobile station is still booked in and active at the first base station 106 and there is no interaction with the second base station 108. During the time interval 320 the mobile station is connected to but suspended from the base station 106 and starts an authentication of the user of the mobile station against the communication network via the base station 108. There is no user data transmission to the mobile station neither by the base station 106 nor the base station 108. During time interval 322 the connection between the mobile station 102 and the base station 106 is active and no connection is established with the base station 108. During time interval 324 the first base station 106 is connected to but has suspended the mobile station 102; there is no user data transmission to the mobile station. During the time interval 324 the second base station 108 has established for the first time an active connection to the mobile station. During this interval an exchange of user data may occur for the first time between the second base station and the mobile station. During the time interval 326 there is no communication between the base station 108 and the mobile station 102 while there is established an active connection with the base station 106 retrieving the last user data on that path. At the end of the time interval 326, the connection between the mobile station and the first base station is released. At the point in time 332 the handover is completed. In the time interval 328 after the handover the mobile station is connected to the base station 108. During the time interval 328, the first base station still holds the configuration data of the mobile station for fast recovery in the case of a handover failure. After the time interval 328 the mobile station is not known anymore to the first base station and there is no connection to the mobile station via the first base station 106. During the time interval 328 and after the time interval 328 there is an active connection between the mobile station 102 and the base station 108. The mobile station has been transferred in the period of time between the point in time 330 and the point in time 332 during a handover process or a handover phase from base station 106 to base station 108.

As mentioned above, the graphs 302 and 303 show the dataflow rates of the dataflows that are processed by the anchor point 104, e.g. a ASN-GW, towards the mobile station. Until the point in time 330 is reached a dataflow at a data rate defined by the transmitted service is processed to the base station 106. The dataflow rate can relate to a service level agreement that has been made by the operator of the communication network and the user of the mobile station 102. Then, from the moment in time 330 when there is a handover indication, the dataflow that is processed towards the mobile station via the base station 106 is reduced. The dataflow that is sent between the point in time 330 until the point in time 332 corresponds to the first dataflow. The data rate of the first dataflow is below the first rate, which corresponds to a preset value. After the handover of the mobile station 102 has been completed, thus after the point in time 332, the dataflow is increased in order to catch up with the for example service level agreement and in order to empty the queue. The increased dataflow corresponds to the second dataflow that is sent towards the base station 108. The data rate of the second dataflow is set to a value which is larger than the set second rate.

In the case the handover is performed in the IEEE802.16 or WiMAX access network it takes the time of several frames (air interface interactions) for a mobile device to move the transmission of user data from the first base station 106 to the second base station 108. During this preparation phase of the handover the mobile station suspends the interaction with the active connected path to the first base station 106 as indicated by the diagonally hatched areas 308, 312, 316, 320, 324. During this "spare" time the mobile station tries to detect the target (second) base station 108 as indicated in the cross hatched area 308. After the mobile station has detected the second base station as preferred candidate for a handover it tries to register itself to that base station 312, 316, 320. During this registration (after 312) the transmission characteristics of both paths are known to the network and the mobile station and the handover can be initiated with an handover indication at the point in time 330. The registration on the new path to the second base station 108 is completed at the point in time 332. The advantage of shaping to support this process is started in this diagram at the time of handover indication 330 (but may be started earlier or later depending on the service transmitted and network deployment aspects) and throttles the data flow. After completion of handover at the point in time 332, the traffic is shaped to a level higher than requested, thus to a data rate that is higher than the second rate, in order to transmit the packets stored meanwhile in the queue.

Figure 4:
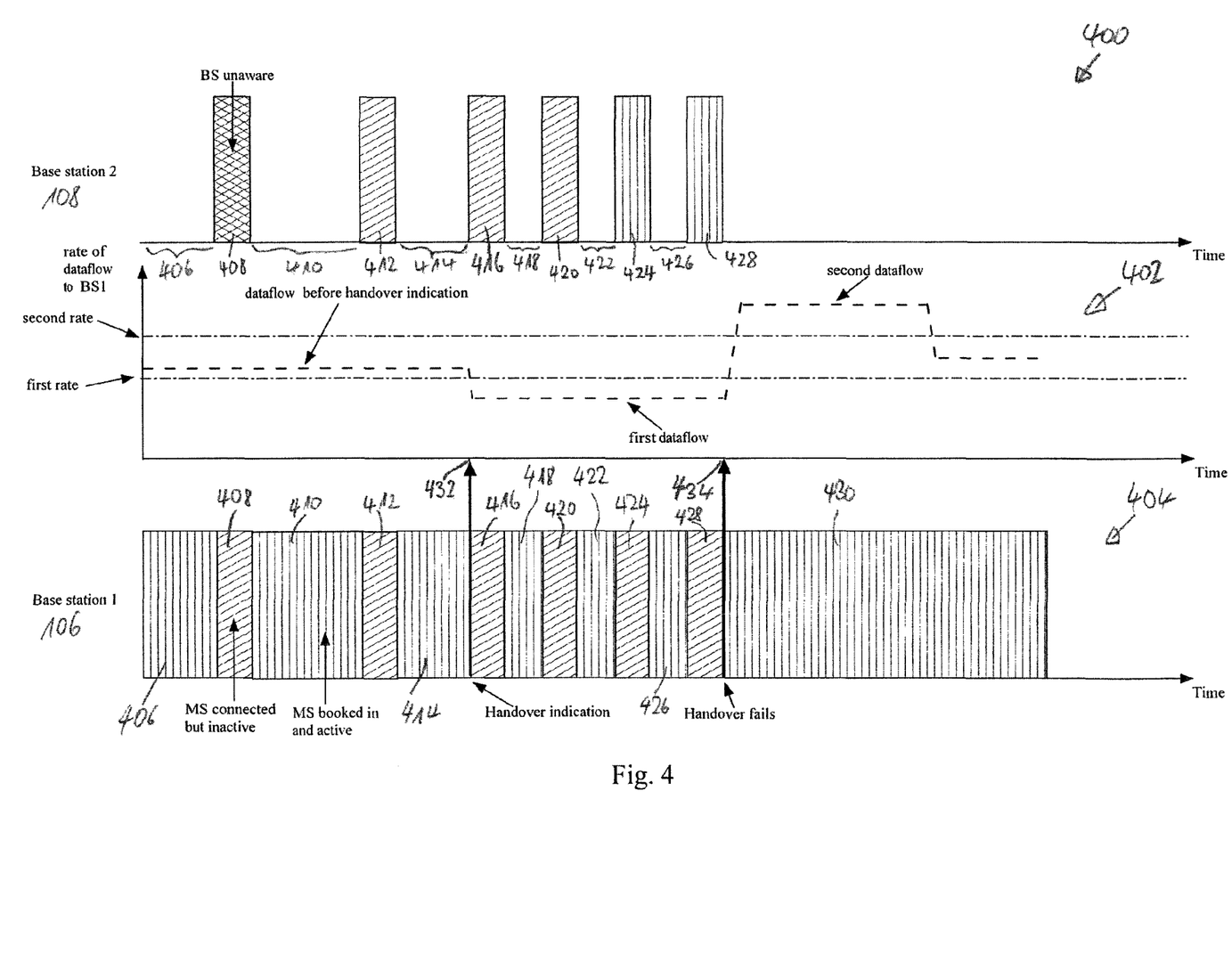
FIG. 4 depicts interactions of base stations with a mobile station before and during a handover that is aborted and a diagram of the dataflow rates of the dataflows processed towards the mobile station.

FIG. 4 depicts interactions of base stations with a mobile station before, during and after the abortion of a handover in the diagram of the dataflow rates of the dataflows that are processed by the anchor point towards the mobile station.

The graph 400 illustrates an example of the communication between the mobile station 102 and the second base station 108, while the graph 404 illustrates the communication between the mobile station 102 and the first base station 106. The reference numerals of the mobile station 102, the first base station 106 and the second base station 108 refer to the block diagram of FIG. 1. The graph 402 shows the dataflow rates of the dataflows as they are sent from the anchor point 104 which can be a wireless access network controller (ASN-GW) in the context of the IEEE802.16 (WIMAX) standard to the first base station. The abscissas and the ordinates of the graphs 400, 402, 404 correspond to the ones of the graphs 300, 302 and 303.

During the time interval 406 the mobile station 102 is booked in and active with the base station 106, while there is no interaction between the mobile station and the base station 108. During the time interval 408 the mobile station is connected to the base station 106 but suspended and inactive and tries to detect the base station 108. During the time interval 410 there is an active communication established between the mobile station 102 and the first base station 106 while the mobile station is not known to and not booked into the base station 108 from the beginning of the time interval 406 until the end of the time interval 410. During the time interval 412 the mobile station 102 is still connected to the base station 106 but begins to register to the base station 108. During the time interval 414 the mobile station is booked in and active with respect to the base station 106 while there is no connection with the base station 108. During the period of time 416 the mobile station is connected (but suspended) to the base station 106 and continues registration to the base station 108 while during the period of time 418 the mobile station connected to and active with respect to the base station 106 while there is no interaction with the base station 108. During the period of time 420 the mobile station is registered to both base stations 106 and 108. During the period of time 422 the mobile station 102 is connected to and active with respect to the base station 106 and there is no interaction with the base station 108. During the time interval 424 the mobile station 102 is connected but suspended to base station 106 while it is booked in and active with respect to the base station 108. During the time interval 426 the mobile station 102 is booked in and active with respect to the base station 106 and there is no interaction with base station 108. The mobile station is furthermore during the time interval 428 connected to and trying to transmit user data to the base station 108 but still connected to the base station 106 for the last user data packets on the old path. The mobile station 102 re-registers to the base station 106 while there is no connection anymore with the base station 108. The handover has failed at the point in time 430. A reason for the handover failure may be a quick fading of the signal strength of the second base station.

As mentioned above, the graph 402 shows the dataflow rates of the dataflows that are processed by the anchor point 104, e.g. a ASN-GW, towards the mobile station. Until the point in time 432 is reached a dataflow at a constant data rate is processed to the base station 106. The dataflow rate can relate to a service level agreement that has been made by the operator of the communication network and the user of the mobile station 102. Then from the moment in time 432 when there is a handover indication the dataflow that is processed towards the mobile station via the base station 106 is reduced. The dataflow that is sent between the point in time 432 until the point in time 434 corresponds to the first dataflow. The flow rate of the first dataflow is below the first rate, which corresponds to a preset value. After the handover of the mobile station 102 has been aborted, thus after the point in time 434, the dataflow is increased. The increased dataflow corresponds to the second dataflow that is sent towards the mobile station 102 via the base station 106. The flow rate of the second dataflow is set to a value which is larger than a the set second rate.

LIST OF REFERENCE NUMERALS

100 Communication network
102 Mobile station
104 Anchor point
106 Base station
108 Base station
110 Storage device
112 Microprocessor
114 Network path
116 Network path
118 Dataflow
120 First dataflow
122 Second dataflow
124 Queue
126 Computer program product
128 First dataflow rate
130 Second dataflow rate
132 First rate
134 Second rate
136 Connection
138 Connection
300 Graph
302 Graph
303 Graph
304 Graph
306 Time interval
308 Time interval
310 Time interval
312 Time interval
314 Time interval
316 Time interval
318 Time interval
320 Time interval
322 Time interval
324 Time interval
326 Time interval
328 Time interval
330 Point in time when handover is indicated
332 Point in time when handover is indicated
400 Graph
402 Graph
404 Graph
406 Time interval
408 Time interval
410 Time interval
412 Time interval
414 Time interval
416 Time interval
418 Time interval
420 Time interval
422 Time interval
424 Time interval
428 Time interval
430 Time interval
432 Point in time when handover is indicated
434 Point in time when handover is indicated

The invention claimed is:
1. A method of performing a handover of a mobile station, said method comprising:
receiving a dataflow, said dataflow including the downlink data traffic to a mobile station;
queuing said dataflow in a queue;

generating during handover of said mobile station a first dataflow from the queued dataflow, said first dataflow having a dataflow rate which is below a given first rate, wherein the first rate is below the dataflow rate of the received dataflow;

sending said first dataflow via a first base station to said mobile station during handover;

generating a second dataflow from the queued dataflow after completion or abortion of the handover, said second dataflow having a dataflow rate which is above a given second rate, wherein said second rate is above the dataflow rate of the received dataflow; and sending said second dataflow for a given period of time after completion of the handover via a second base station to said mobile station or for the given period of time after abortion of the handover via said first base station to said mobile station, wherein the given period of time relates to the amount of time needed to perform the handover so that said second dataflow compensates for a foregoing reduction of the dataflow rate.

2. The method of claim 1, wherein before the handover and after said second dataflow said dataflow is sent to said mobile station.

3. The method of claim 1, wherein said dataflow comprises a sequence of data packets, wherein said first dataflow and said second dataflow is generated so that said sequence of data packets remains the same.

4. A method of performing a handover of a mobile station from a first base station to a second base station, the method being performed by the mobile station, said method comprising:

receiving a dataflow, said dataflow including the uplink data traffic of the mobile station;

queuing said dataflow;

generating during handover of said mobile station a first dataflow from the queued dataflow, said first dataflow having a data flow rate that is below a given first rate, wherein the first rate is below the dataflow rate of the received dataflow;

sending said first dataflow from said mobile station during handover;

generating a second dataflow from the queued dataflow after completion or abortion of said handover, said second dataflow having a dataflow rate which is above a given second rate, wherein said second rate is above the dataflow rate of the received dataflow; and sending said second dataflow from said mobile station for a given period of time after completion of the handover to the second base station or after completion of the handover to the first base station, wherein the given period of time relates to the amount of time that is needed to perform the handover so that the second dataflow compensates for a foregoing reduction of the dataflow rate.

5. A communication network component linking a first base station and a second base station, the network component comprising:

means for receiving a dataflow, said dataflow including the downlink data traffic to a mobile station;

means for queuing said dataflow;

means for generating during handover of said mobile station from the first base station to the second base station a first dataflow from the queued dataflow, said first dataflow having a dataflow rate which is below a given first rate, wherein the first rate is below the dataflow rate of the received dataflow;

means for sending said first dataflow via said first base station to said mobile station during handover;

means for generating a second dataflow from the queued dataflow after completion or abortion of said handover, said second dataflow having a dataflow rate which is above a given second rate, wherein the second rate is above the dataflow rate of the received dataflow; and means for sending said second dataflow for a given period of time after completion of the handover via said second base station to said mobile station or for the given period of time after abortion of the handover via said first base station to said mobile station, wherein the given period of time relates to the amount of time needed to perform the handover so that said second dataflow compensates for a foregoing reduction of the dataflow rate.

6. The communication network component of claim 5, wherein said communication network component is a wireless access network controller in accordance with the 802.16 standard.

7. A communication network comprising:

a first base station;

a second base station; and a network component including:

means for receiving a dataflow, said dataflow including the downlink data traffic to a mobile station, means for queuing said dataflow, means for generating during handover of said mobile station from the first base station to the second base station a first dataflow from the queued dataflow, said first dataflow having a dataflow rate which is below a given first rate, wherein the first rate is below the dataflow rate of the received dataflow, means for sending said first dataflow via said first base station to said mobile station during handover, means for generating a second dataflow from the queued dataflow after completion or abortion of said handover, said second dataflow having a dataflow rate which is above a given second rate, wherein the second rate is above the dataflow rate of the received dataflow, and means for sending said second dataflow for a given period of time after completion of the handover via said second base station to said mobile station or for the given period of time after abortion of the handover via said first base station to said mobile station, wherein the given period of time relates to the amount of time needed to perform the handover so that said second dataflow compensates for the foregoing reduction of the dataflow rate.

8. A mobile station comprising:

means for queuing dataflow that is to be sent by the mobile station;

means for generating during handover of said mobile station a first dataflow from the queued dataflow, said first dataflow having a dataflow rate which is below a given first rate, wherein the first rate is below the dataflow rate of received dataflow;

means for sending said first dataflow from said mobile station during handover to a first base station;

means for generating a second dataflow from the queued dataflow after completion or abortion of said handover, said second dataflow having a dataflow rate which is above a given second rate, wherein the second rate is above the dataflow rate of the received dataflow; and means for sending said second dataflow for a given period of time after completion of the handover to said second base station or for the given period of time after abortion of the handover to said first base station, wherein the given period of time relates to the amount of time needed to perform the handover so that said second dataflow compensates for a foregoing reduction of the dataflow rate.

9. The communication network of claim 7 wherein said communication network component is a wireless access network controller in accordance with the 802.16 standard.

* * * * *